(12) United States Patent
Kim et al.

(10) Patent No.: US 6,877,769 B2
(45) Date of Patent: Apr. 12, 2005

(54) CURTAIN AIR BAG FOR A CAR

(75) Inventors: Joon-Ho Kim, Seoul (KR); Ik-Hwan Kim, Chungcheongnam-do (KR); Byong-Ryong Cho, Kyunggi-do (KR); Gun-Woo Kim, Kyunggi-do (KR)

(73) Assignee: HYNDAI Mobis, Co., Ltd., Kyunggi-do (KR)

( * ) Notice: Subject to any disclaimer, the term of this patent is extended or adjusted under 35 U.S.C. 154(b) by 136 days.

(21) Appl. No.: 10/326,066

(22) Filed: Dec. 23, 2002

(65) Prior Publication Data

US 2003/0230877 A1 Dec. 18, 2003

(30) Foreign Application Priority Data

Jun. 17, 2002 (KR) .................................. 10-2002-0033626

(51) Int. Cl.$^7$ .......................... B60R 21/16; B60R 21/22
(52) U.S. Cl. .................................. 280/730.2; 280/743.1
(58) Field of Search .......................... 280/730.2, 730.1, 280/728.1, 743.1; B60R 21/22

(56) References Cited

U.S. PATENT DOCUMENTS 6,199,898 B1 * 3/2001 Masuda et al. .......... 280/730.2

2003/0178831 A1 * 9/2003 Roberts et al. .......... 280/743.1

* cited by examiner

*Primary Examiner*—Ruth Ilan
(74) *Attorney, Agent, or Firm*—Greenblum & Bernstein, P.L.C.

(57) ABSTRACT

A curtain air bag includes a diffuser having an opening that emits operation gas, placed at a predetermined area along an inner side of a roof rail, a first cushion divided into first and second areas that limits a front seat and a rear seat, a third area that forms a front area of the first area, and a fourth area placed between the first area and the second area. The curtain airbag further includes a plurality of cushion holders that fix the first cushion into the roof rail by coupling to the top of the first cushion, a first downwardly extended portion of the first cushion connected to a lower surface of the first area and providing a predetermined area to protect ribs of a passenger sitting in the front seat, a second downwardly extended portion of the first cushion connected to a lower part of the second area and providing a predetermined area to protect ribs of a passenger sitting in the rear seat.

2 Claims, 2 Drawing Sheets

[FIG. 1] PRIOR ART
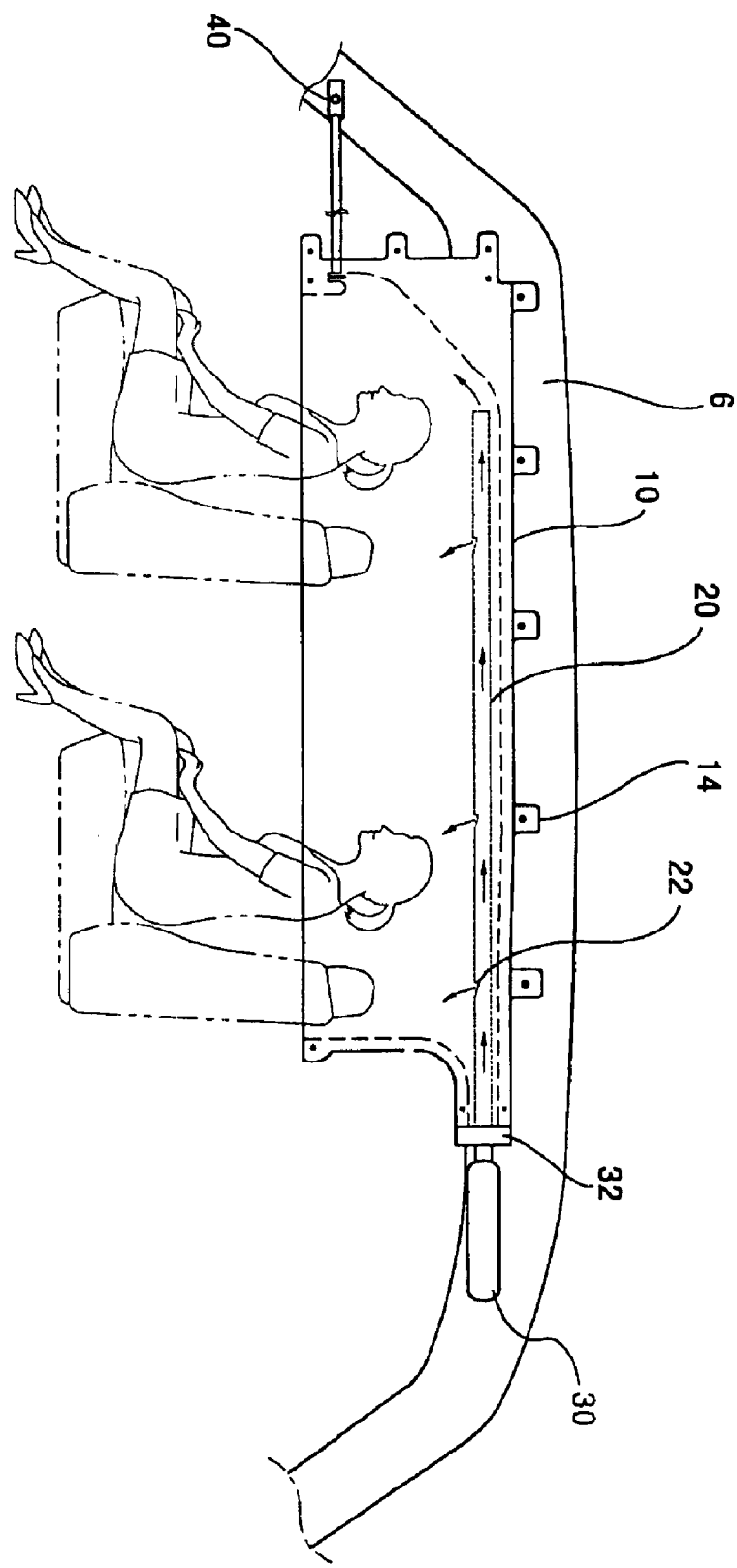

[FIG. 2]
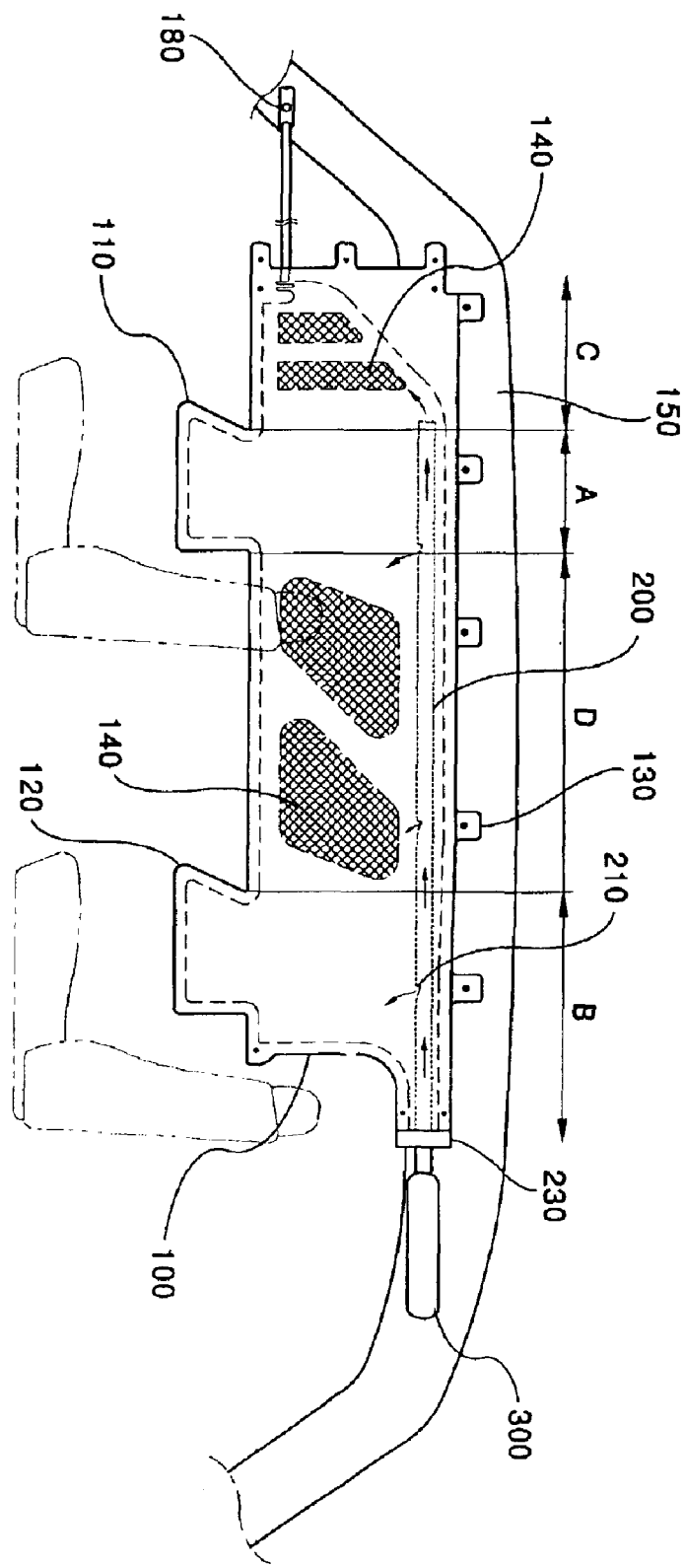

CURTAIN AIR BAG FOR A CAR

BACKGROUND OF THE INVENTION

1. Field of the Invention

The present invention relates to a curtain air bag for a car, more particularly to a curtain air bag for a car to protect a passenger in the ribs as well as in the head simultaneously at an automobile accident.

2. Description of the Related Art

Recently, people are getting more and more interested in safety as well as functionality and convenience of a car when driving a car. As a result, the safety devices for protecting passengers become important at automobile accidents as well.

Among these devices, an air bag system is used, along with a seat belt, to prevent a passenger from being injured at head-on collision or broadside collision.

Particularly, an air bag system related to broadside collision is classified into a curtain air bag for protecting a passenger in the head and a side air bag for protecting a passenger in the ribs.

Here, the curtain air bag system is installed along the top side of the inside of a car, so at an automobile accident, it is spread like a curtain. And installed in the sides of the car doors or seats, it prevents a passenger from being injured in the ribs, caused by being directly hit with the body of the car including the doors.

On the other hand, FIG. 1 is a drawing illustrating the structure of a conventional curtain air bag system.

As illustrated in the drawing, the curtain air bag includes a cushion 10 placed at a predetermined area along the inner side of a roof rail 6; a cushion holder 14 to fix the cushion 10 to the roof rail 6; an opening 22; a diffuser 20 installed in the inside of the cushion 10; and an inflator unit 30 to be coupled with a part of the diffuser 20.

A diffuser 20 has a shape of pipe, and a plurality of openings 22 are formed at predetermined distances on one part of the external surface.

A cushion 10 is connected to the opening 22 and covers tightly around the diffuser 20 over a predetermined area.

An inflator unit 30 is connected to one part of the diffuser 20, and the connected part, wrapped with the cushion 10, is solidly covered after being tightened by a clamp 32.

In addition, the inflator unit 30 is connected electrically to a sensor (not illustrated) which senses a car collision.

On the other hand, a tether 40 is coupled to one part of the cushion 10 to support the front pillar (not illustrated) and guide for the cushion 10 to be spread in all directions.

Accordingly, when a signal is noticed from the sensor at a car collision, operation gas generates from the inflator unit 30 and is emitted into the inside of the diffuser 20. This gas is again emitted into the inside of the cushion 10 through the opening 22 of the diffuser 20 to expand the cushion 10 into a predetermined area.

The curtain air bag as illustrated in the above, however, is made only for protecting a passenger in the head. To protect the passenger in the ribs from broadside collision, it is necessary to mount additional side air bag with the curtain air bag to the doors or seat.

As a result, a plurality of wiring system and a complicated peripheral devices are required to mount the curtain air bag and side air bag to a car, which leads considerable additional cost and plenty of restrictions in designing car seats or doors.

SUMMARY OF THE INVENTION

The object of present invention devised for solving a problem of the mentioned conventional art is to provide a curtain air bag for a car to protect a passenger in the ribs as well as in the head simultaneously at broadside collision.

To achieve the above object, there is provided a curtain air bag for a car including a diffuser having an opening that emits operation gas, placed at a predetermined area along an inner side of a roof rail; a first cushion divided into first and second areas that limit a front seat and a rear seat, a third area that forms a front area of the first area, and a fourth area placed between the first area and the second area, the cushion being connected to the opening and covering tightly around the diffuser over a predetermined area; a plurality of cushion holders that fix the first cushion into the roof rail by coupling to the top of the first cushion; a first downwardly extended portion of the first cushion connected to a lower surface of the first area; and providing a predetermined area to protect ribs of a passenger sitting in the rear front seat; a second downwardly extended portion of the first cushion connected to a lower part of the second area and providing a predetermined area to protect ribs of a passenger sitting in the rear seat: and an inflator unit connected to one part of the first cushion. Further, the fourth area has at least one non-spreading area, and the first, cushion and the first and second downwardly extended portions of the first cushion are configured to simultaneously spread by operation gas provided by the inflator unit.

In addition, the third area has at least a non-expanding area which is restricted the expanding, since an coming in and out of an inner operation gas is limited when the first cushion is expanded.

According to the above constitution, when a shock is noticed through a sensor dining an automobile accident, operation gas is emitted from the inflator unit and sent to the diffuser, and the emitted operation gas is gushed into the first, cushion and the first and second downwardly extended portions of the first cushion through the opening to expand those cushion and portions in a moment.

As a result, it is possible to protect ribs of a passenger not only head of the passenger with the help of the first cushion and the first and second downwardly extended portions of the first cushion simultaneously.

In addition, it allows a lot of wirings and complicated peripheral devices to be excluded from a car, due to the additional side air bag mounted, which controls additional cost needed for mounting side air bags as well as gives plenty of freedom in designing the seats or doors.

Besides, it forms non-expanding area where the expanding is controlled by the operation gas within non-effective area of the first cushion, which makes it possible to maximize the expanding effectiveness of the first cushion and the first and second downwardly extended portions of the first cushion. And it is also possible to control the capacity of the inflator unit properly in proportion to the size of non-expanding area.

BRIEF DESCRIPTION OF THE DRAWINGS

The above objects, features and advantages of the present invention will become more apparent from the following detailed description when taken in conjunction with the accompanying drawings, in which:

FIG. 1 is a sketch illustrating the structure of a conventional curtain air bag system.

FIG. 2 is a sketch illustrating a curtain air bag in accordance with an embodiment of the present invention.

DETAILED DESCRIPTION OF THE PREFERRED EMBODIMENT

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 2 is a sketch illustrating a curtain air bag in accordance with an embodiment of the present invention.

With reference to FIG. 2, the curtain air bag of the present invention includes an inflator unit 300 for generating operation gas, a diffuser 200 connected to the inflator unit 300, and a first cushion 100 covering tightly around the diffuser 200 over a predetermined area.

In addition, as a supplementary means to protect a passenger in the ribs along with the first cushion 100, there are included a first downwardly extended portion 110 of the first cushion 100 and a second downwardly extended portions 120 of the first cushion 100 which have a predetermined area on and are connected to the first cushion 100.

On the first cushion 100, a plurality of cushion holders 130 are arranged over a predetermined area on the upper part and are coupled one another, and through these cushion holders 130, prescribed assembly means are fixed over a roof rail 150.

The cushion holders 130 play a role of holding a cushion as folded when it is not spread and, at the same time, preventing the cushion from being taken off from the roof rail 150 when it is spread.

On the other hand, a pipe-shaped diffuser 200 is mounted over the upper part of the inside of the first cushion 100 and it is arranged along the inner part of the roof rail 150.

The diffuser 200 has a plurality of openings arranged at predetermined intervals in the direction of the longest side of a car body. An end of its one part is connected to an inflator unit 300, which covers this connecting part completely, as surrounded by the first cushion 100, by being tightened through a clamp 230.

Accordingly, it is made for operation gas generating from the inflator unit 300 to flow into the diffuser 200 and to be emitted to the inside of the first cushion 100 through the opening 210 again.

On the other hand, though the inflator unit 300 is not illustrated in detail on the drawing, it is largely composed of an inflator, which generates operation gas, and an inflator housing, which accepts the inflator.

Here, the inflator has a gas generator with it for generating operation gas in the inside, and it is made to generate operation gas by igniting the gas generator by means of an electric signal given from the outside.

The first cushion 100 for protecting a passenger in the head sitting in the front and rear seats is covered to have a predetermined area around the diffuser 200 by being connected to the opening 210.

In addition, the first cushion 100, as illustrated in the drawing, is divided into a first area A, which limits the side of the front seat, a second area B, which limits the side of the rear seat, a third area C, which forms the front of the first area A, and a fourth area D, which is located between the first area A and the second area B.

Here, the first area A and the second area B are those corresponding to the locations of passengers sitting in the front and rear seats, so when the first cushion 100 is spread, they limit the areas which directly meet the head of a passenger.

The third area C and the fourth area D are those over the first cushion 100 except the first area A and the second area B, so when the first cushion 100 is spread, they limit the areas which don't directly meet a passenger.

Besides, the third area C and the fourth area D form at least more than one non-expanding area for partly limiting the expanding of the first cushion 100 when the first cushion 100 is spread.

The non-expanding area 140 is the simplest method to be formed. Normally, the subject is sewn right away or back-stitched with cloth put upon it, and thereby, when the first cushion 100 is spread, it is made sure to compulsively limit the expanding of the sewn area.

Thus, the reason that another non-expanding area 140 is formed over the first cushion 100 is to maximize the expanding efficiency of the first cushion and, at the same time, minimize the capacity of the inflator unit 300 by fundamentally blocking operation gas in the areas where a passenger doesn't have a direct influence on protection.

In consideration of proper ventilation of operation gas moving fast in the first cushion 100, the non-expanding area as described in the above can be properly formed as much as necessary without limitation on its shape and number.

On the other hand, the first downwardly extended portion 110 of the first cushion 100 is connected in a unit to the second downwardly extended portion 120 of the first cushion 100 on the lower parts of the first cushion 100 located in the first area A and the second area B to protect ribs of a passenger.

Here, the first and second downwardly extended portions 110 and 120 of the first cushion 100 are the lower parts of the first cushion 100 located in the first area A and the second area B, which are extended downward over predetermined areas, so when the first cushion 100 is expanded, they are expanded together to protect ribs of a passenger.

Hereafter, more concrete effect of the present invention will be described with reference to FIG. 2.

Above all, when an electric signal is given to the inflator unit 300 to operate the air bag after the shock is noticed by a collision detection sensor (not illustrated) at an automobile accident, a gas generator in the inflator unit 300 begins to burn and emits operation gas to the diffuser 200.

The operation gas flowed into the diffuser 200 is emitted again to the first cushion 100 through the opening 210 to expand it to the full and expand the first and second downwardly extended portions 110 and 120 connected to the first cushion 100 in a moment.

Accordingly, as the first cushion 100 is limited to expand partly by means of non-expanding area 140, and spread over predetermined areas around the head of a passenger, it can protect the head of a passenger by supporting it first before it touches the inner surface of the roof rail or the front pillar.

At the same time, as it is supported first through the first and second downwardly extended portions 110 and 120 of the first cushion 100 before the ribs of a passenger touch the door of a car, it can protect a passenger from being injured by the door at an automobile accident.

According the present invention, it is possible to protect the head of a passenger through the first cushion at an automobile accident by having the first and second downwardly extended portions 110 and 120 in a unit in the lower part of the first cushion, and at the same time, it is possible to protect the ribs of a passenger with the first and second downwardly extended portions 110 and 120 of the first cushion 100 as well.

Besides, it allows a plurality of wiring and complicated peripheral devices, due to side air bags mounted in the seat or door side to protect a passenger in the ribs, to be excluded. That controls additional cost needed for mounting side air bags as well as gives plenty of freedom in designing the seats or doors.

And it forms non-expanding area where the expanding is limited by the operation gas within non-effective area of the first cushion, which makes it possible to maximize the expanding effectiveness of the first cushion and the first and second downwardly extended portions 110 and 120 of the first cushion 100. And it is also possible to control the capacity of the inflator unit properly in proportion to the size of non-expanding area.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A curtain air bag, comprising:

a diffuser having an opening that emits operation gas, placed at a predetermined area along an inner side of a roof rail;

a first cushion divided into a first area and a second area that limit a front seat and a rear seat, a third area that forms a front area of the first area, and a fourth area placed between the first area and the second area, the first cushion being connected to the opening and covering tightly around the diffuser over a predetermined area;

a plurality of cushion holders that fix the first cushion into the roof rail by coupling to the top of the first cushion;

a first downwardly extended portion of the first cushion connected to a lower surface of the first area and providing a predetermined area to protect ribs of a passenger sitting in the front seat;

a second downwardly extended portion of the first cushion connected to a lower part of the second area and providing a predetermined area to protect ribs of a passenger sitting in the rear seat; and an inflator unit connected to one part of the first cushion to provide operation gas for the diffuser, wherein the fourth area has at least a non-expanding area where expanding is restricted when the first cushion is spread, and the first cushion and the first and second downwardly extended portions are configured to simultaneously spread by operation gas provided by the inflator unit.

2. The curtain air bag according to claim 1, wherein the third area has at least a non-expanding area where expanding is restricted by limiting the amount of an inner operation gas coming in and out when the first cushion is expanded.

* * * * *

UNITED STATES PATENT AND TRADEMARK OFFICE
CERTIFICATE OF CORRECTION

PATENT NO. : 6,877,769 B2
DATED : April 12, 2005
INVENTOR(S) : J.H. Kim et al.

It is certified that error appears in the above-identified patent and that said Letters Patent is hereby corrected as shown below:

Title page,
Item [73], Assignee, "HYNDAI Mobis, Co., Ltd." should be -- HYUNDAI Mobis Co. Ltd. --.

Signed and Sealed this

Thirteenth Day of December, 2005

JON W. DUDAS
*Director of the United States Patent and Trademark Office*